US012688698B2

(12) United States Patent
Zhu et al.

(10) Patent No.: US 12,688,698 B2
(45) Date of Patent: Jul. 21, 2026

(54) OBSTACLE RECONGNITION METHOD APPLIED TO AUTOMATIC TRAVELING DEVICE AND AUTOMATIC TRAVELING DEVICE

(71) Applicant: Suzhou Cleva Precision Machinery & Technology Co., Ltd., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd., Suzhou City (CN)

( * ) Notice: Subject to any disclaimer, the term of this patent is extended or adjusted under 35 U.S.C. 154(b) by 569 days.

(21) Appl. No.: 18/251,583

(22) PCT Filed: Nov. 20, 2020

(86) PCT No.: PCT/CN2020/130294
§ 371 (c)(1),
(2) Date: May 3, 2023

(87) PCT Pub. No.: WO2022/095137
PCT Pub. Date: May 12, 2022

(65) Prior Publication Data
US 2024/0071094 A1      Feb. 29, 2024

(30) Foreign Application Priority Data

Nov. 3, 2020      (CN) ........................ 202011209666.X

(51) Int. Cl.
*G06V 20/58*      (2022.01)
*G06V 10/26*      (2022.01)
(Continued)

(52) U.S. Cl.
CPC .............. *G06V 20/58* (2022.01); *G06V 10/26* (2022.01); *G06V 10/30* (2022.01); *G06V 10/44* (2022.01);
(Continued)

(58) Field of Classification Search
CPC ........ G06V 20/58; G06V 10/26; G06V 10/30; G06V 10/44; G06V 10/507; G06V 10/56;
(Continued)

(56) References Cited

U.S. PATENT DOCUMENTS

2012/0170808 A1      7/2012  Ogaga et al.
2016/0086052 A1*     3/2016  Piekniewski ........... G06T 7/292
                                                             382/103

(Continued)

FOREIGN PATENT DOCUMENTS

CN          104111460 A          10/2014
CN          108121948 A          6/2018
CN          111538034 A          8/2020

OTHER PUBLICATIONS

International Search Report for Application No. PCT/CN2020/130294, dated May 12, 2022.

(Continued)

*Primary Examiner* — Amandeep Saini
*Assistant Examiner* — Denise G Alfonso
(74) *Attorney, Agent, or Firm* — JK Intellectual Property Law, PA

(57)      ABSTRACT

An obstacle recognition method applied to an automatic traveling device may include the steps of: obtaining an image of an environment in a traveling direction of an automatic traveling device; separating out a chrominance channel image and a luminance channel image based on the image; performing pre-processing and edge processing on the luminance channel image to obtain an edge image;

(Continued)

performing histogram statistics on the chrominance channel image to obtain a number of pixels with a maximum color proportion within a preset chrominance interval range, denoted as max H; performing segmentation and contour processing on the chrominance channel image to obtain a chrominance segmentation threshold and a contour image; performing contour detection on the contour image to obtain a contour block; collecting statistics on feature values corresponding to the contour block in the edge image and the contour image; and comparing the max H and the feature values with preset obstacle recognition and determination conditions to obtain recognition results. The disclosure is also directed to a related automatic traveling device and readable storage medium.

6 Claims, 2 Drawing Sheets

(51) Int. Cl.

| | |
|---|---|
| *G06V 10/30* | (2022.01) |
| *G06V 10/44* | (2022.01) |
| *G06V 10/50* | (2022.01) |
| *G06V 10/56* | (2022.01) |
| *G06V 10/75* | (2022.01) |

(52) U.S. Cl.
CPC ............ *G06V 10/507* (2022.01); *G06V 10/56* (2022.01); *G06V 10/751* (2022.01)

(58) Field of Classification Search
CPC .... G06V 10/751; G06V 10/273; G06V 10/50; G06T 7/90; G06T 7/136; G06T 7/187; G06T 2207/10016
See application file for complete search history.

(56) References Cited

U.S. PATENT DOCUMENTS

| | | |
|---|---|---|
| 2017/0060132 A1 | 3/2017 | Woojin et al. |
| 2018/0084708 A1* | 3/2018 | Neitemeier .......... A01B 69/001 |

OTHER PUBLICATIONS

EP Search Report for EP Application No. 20960594.8, dated Sep. 17, 2024.
Reply to Written Opinion for EP Application No. 20960594.8, dated Apr. 3, 2025.

* cited by examiner

OBSTACLE RECONGNITION METHOD APPLIED TO AUTOMATIC TRAVELING DEVICE AND AUTOMATIC TRAVELING DEVICE

CROSS-REFERENCE TO RELATED PATENT APPLICATIONS

This application is a national stage of International Application No. PCT/CN2020/130294, filed on Nov. 20, 2020, which claims priority to CN patent application No. 202011209666.X, filed on Nov. 3, 2020. All of the aforementioned applications are hereby incorporated by reference in their entireties.

TECHNICAL FIELD

The present application relates to the field of artificial intelligence technology, in particular to an obstacle recognition method applied to an automatic traveling device, and to an automatic traveling device.

BACKGROUND

With the gradual acceleration of urban greening and the rapid development of lawn industry, grasses at urban lawns, golf courses, airports, private gardens, parks, playgrounds, and the like need to be regularly trimmed to ensure aesthetics. However, annual trimming requires a large amount of time, funds, and manpower.

At present, automatic traveling devices are usually used instead of manual labor for trimming. Unmanned lawn mowers can liberate labor from highly repetitive and boring mowing operations, and have become an inevitable trend in social development. Cutting blades of the unmanned lawn mowers are sharp and uncontrollable in safety. During unmanned operation, the unmanned lawn mowers may encounter stationary or moving obstacles, which damage cutting tools or bodies and are highly likely to cause accidents and unnecessary losses.

There are three conventional collision prevention methods for automatic traveling devices:

i. Wires are manually laid around obstacles before mowing, and the mower turns around once it detects an electromagnetic signal during travel. However, the wires are prone to aging and require regular testing and maintenance;

ii. A variety of sensors such as ultrasonic and infrared sensors are used for detection. This method is costly and susceptible to environmental influence; and iii. Coordinate information of obstacles is positioned in advance by GPS positioning. This method is prone to signal interference and internal components are prone to failure.

The foregoing methods are prone to missed determination. Existing collision prevention methods require building of boundary systems and consequently much time and labor are consumed, and costs are high.

SUMMARY

The present disclosure provides an obstacle recognition method applied to an automatic traveling device and an automatic traveling device to solve problems in the prior art that collision prevention methods for automatic traveling devices require building of boundary systems and consequently much time and labor are consumed, and costs are high.

A first aspect of embodiments of the present disclosure provides an obstacle recognition method applied to an automatic traveling device, including:

obtaining an image of an environment in a traveling direction of an automatic traveling device;

separating out a chrominance channel image and a luminance channel image according to the image;

performing pre-processing and edge processing on the luminance channel image to obtain an edge image;

performing histogram statistics on the chrominance channel image to obtain the number of pixels with a maximum color proportion within a preset chrominance interval range, denoted as max H;

performing segmentation and contour processing on the chrominance channel image to obtain a chrominance segmentation threshold and a contour image;

performing contour detection on the contour image to obtain a contour block;

collecting statistics on feature values corresponding to the contour block in the edge image and the contour image; and comparing the max H and the feature values with preset obstacle recognition and determination conditions to obtain recognition results.

According to the obstacle avoidance method in this solution, images of a chrominance channel and a luminance channel are separated out, the luminance channel and the chrominance channel are processed separately, a contour block is obtained through contour detection, and non-lawn regions may be effectively recognized according to statistical feature values of the contour block and preset obstacle recognition and determination conditions, thereby minimizing missed determination.

A second aspect of the embodiments of the present disclosure provides an automatic traveling device, including a memory and a processor. The memory stores a computer program, and the processor implements the steps of the obstacle recognition method applied to an automatic traveling device in the first aspect of the embodiments of the present disclosure when executing the computer program.

According to the automatic traveling device in this solution, images of a chrominance channel and a luminance channel are separated from a captured image of an environment ahead in a traveling direction, the luminance channel and the chrominance channel are processed separately, a contour block is obtained through contour detection, and non-lawn regions may be effectively recognized according to statistical feature values of the contour block and preset obstacle recognition and determination conditions, thereby minimizing missed determination.

A third aspect of the embodiments of the present disclosure provides a readable storage medium storing a computer program. When the computer program is executed by a processor, the steps of the obstacle recognition method applied to an automatic traveling device in the first aspect of the embodiments of the present disclosure are implemented.

BRIEF DESCRIPTION OF THE DRAWINGS

The technical solution of the present application will be further illustrated below with reference to accompanying drawings and embodiments.

DETAILED DESCRIPTION OF THE EMBODIMENTS

It should be noted that the embodiments in the present application and the features in the embodiments may be combined with each other on a non-conflict basis.

The technical solution of the present application will be described in detail below with reference to the accompanying drawings and embodiments.

Embodiment 1

Figure 1:
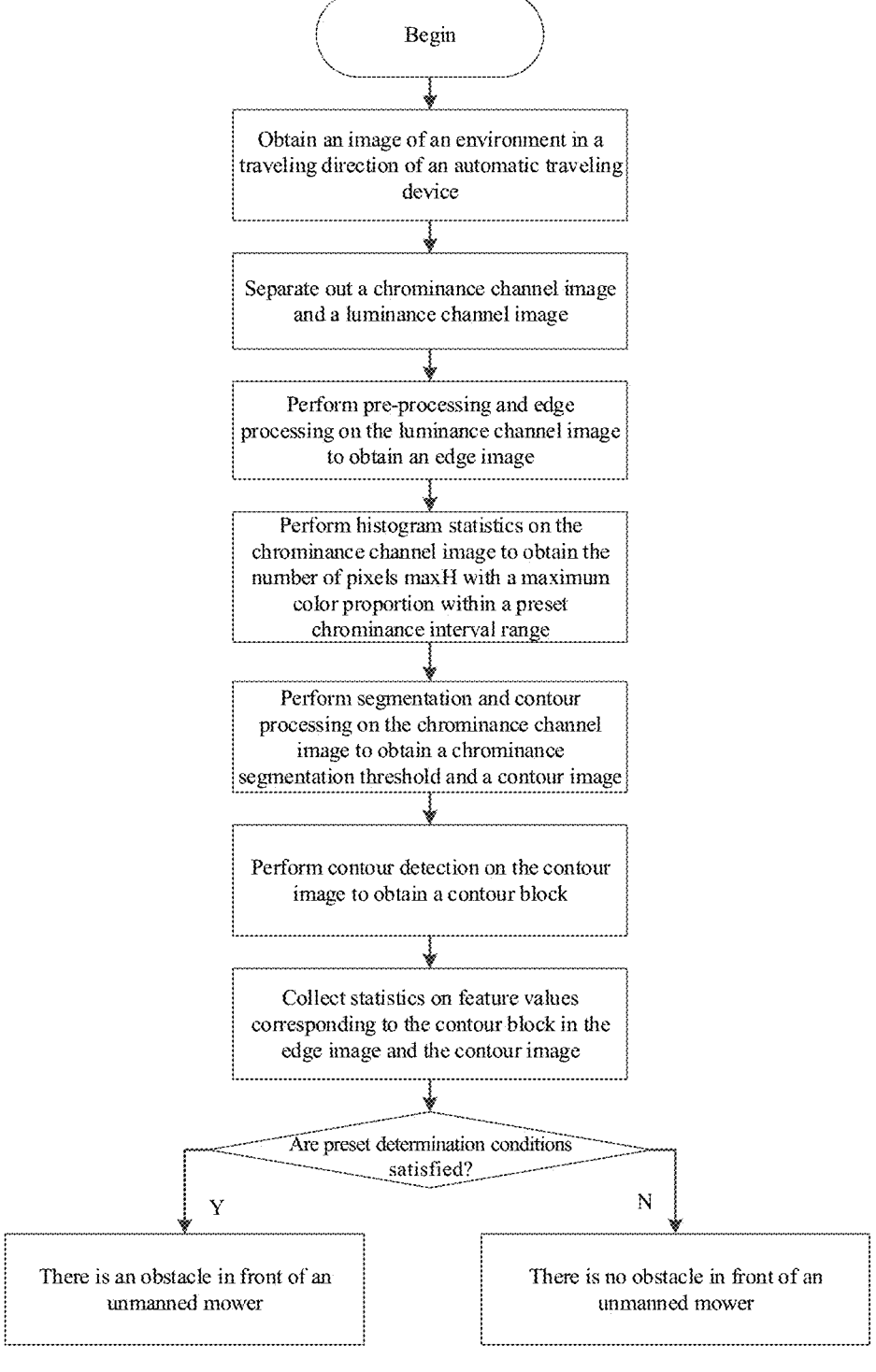
FIG. 1 is a flowchart of a method according to an embodiment of the present application.

Embodiment 1 of the present disclosure provides an obstacle recognition method for an automatic traveling device, as shown in FIG. 1, including:

S1: Obtain an image of an environment in a traveling direction of an automatic traveling device;

S2: Separate out a chrominance channel image and a luminance channel image according to the image;

S3: Perform pre-processing and edge processing on the luminance channel image to obtain an edge image;

S4: Perform histogram statistics on the chrominance channel image to obtain the number of pixels with a maximum color proportion within a preset chrominance interval range, denoted as max H;

S5: Perform segmentation and contour processing on the chrominance channel image to obtain a chrominance segmentation threshold and a contour image;

S6: Perform contour detection on the contour image to obtain a contour block;

S7: Collect statistics on feature values corresponding to the contour block in the edge image and the contour image; and S8: Compare the max H and the feature values with preset obstacle recognition and determination conditions to obtain recognition results.

The automatic traveling device in the embodiment of the present disclosure may be a robot cleaner, a robot mower, or the like. Through image recognition in the obstacle recognition method according to the embodiment of the present disclosure, the automatic traveling device can effectively recognize non-lawn regions during operation, recognize distance information of obstacles ahead, and take reasonable obstacle avoidance measures.

In this embodiment, a camera is disposed in the front of the automatic traveling device. During the operation of the automatic traveling device, the camera captures an image of an environment in front, denoted as orgMat, and the captured image orgMat is an RGB image. The captured image orgMat is converted from an RGB (red, green, blue) space to an HSV (chrominance, saturation, luminance) space, and a chrominance component (H) and a luminance component (V) are extracted. The conversion of the image from the RGB space to the HSV space is a widely-known technology for those skilled in the art, so details are not repeated here.

The luminance channel (V) image is first pre-processed, including filtration and normalization, to obtain a pre-processed image, denoted as normVMat. Edge extraction may be performed on the pre-processed image normVMat by using, but not limited to, a canny operator edge detection algorithm, to obtain an edge image, denoted as cannyMat. The edge extraction can effectively reflect roughness of the image.

Histogram statistics is performed on the chrominance channel (H) image to obtain a chrominance component histogram, denoted as orgLabelsMat. Horizontal coordinates of the chrominance component histogram represent the chrominance component of the image in front of the automatic traveling device, and vertical coordinates represent the number of pixel points. The obtained chrominance component histogram orgLabelsMat is filtered to obtain a de-noised smooth histogram LabelsMat. From the de-noised smooth histogram LabelsMat, statistics on the number of pixels with a maximum color proportion within a preset chrominance interval range is collected, denoted as max H. In this embodiment, the preset chrominance interval range may be 15-180.

The chrominance channel (H) image may be segmented through a dynamic segmentation method to obtain a chrominance segmentation threshold [lowValue, highValue]. The chrominance segmentation threshold [lowValue, highValue] may alternatively be obtained through a fixed threshold segmentation method, such as an Otsu threshold method.

The segmented image obtained after image segmentation is denoted as dstMat, and the image obtained by inversion and open/close operations on dstMat is denoted as obstacleMat.

Contour processing is performed on the image obstacleMat to obtain a contour image, and contour detection is performed on the contour image to obtain a contour block.

Statistics on feature values corresponding to the contour block in the edge image and the contour image are collected, and the features, the max H, and preset obstacle recognition and determination conditions are compared to determine whether there are non-lawn regions in the environmental image in front of the automatic traveling device, that is, whether there are obstacles in front of the automatic traveling device.

In a feasible implementation of this embodiment, the feature values include a contour size feature value $AContours_i.X$, an average roughness value $HContours_i$, and a proportion of black pixel points $BContours_i$ contained in the contour block; or The feature values include a contour size feature value $AContours_i.X$, an average roughness value $HContours_i$, a proportion of pixels $SContours_i$ within the chrominance segmentation threshold range, and a proportion of black pixel points $BContours_i$ contained in the contour block. "i" is a number of the contour block.

Specifically, in the contour size feature value $AContours_i.X$, X may be represented as area, diagonal, width, height, and number of contained pixels, and "I" represents a contour number.

In this embodiment, the image is segmented through the chrominance segmentation threshold [lowValue, highValue] to generate a first image region and a second image region. The proportion of pixels $SContours_i$ within the chrominance segmentation threshold [lowValue, highValue] range in this embodiment refers to a proportion of pixels in the first image region and the second image region.

The chrominance value corresponding to the first image region is within the preset chrominance interval range and the segmentation threshold [lowValue, highValue] range; and the chrominance value corresponding to the second image region is within the preset chrominance interval range, but not within the segmentation threshold [lowValue, highValue] range. For example, the preset chrominance interval is [15, 95], the chrominance segmentation threshold is [15, li], the first image region is a region with chrominance values [15, li], and the second image region is a region with chrominance values [li, 95].

In a feasible implementation of this embodiment, the preset obstacle recognition and determination conditions include a plurality of different preset obstacle recognition and determination conditions, and the comparing the max H and the feature values with preset obstacle recognition and determination conditions to obtain recognition results includes:

comparing the max H and the feature values with the preset obstacle recognition and determination conditions, and if comparison results that the max H and the feature values satisfy one or more of the plurality of different preset obstacle recognition and determination conditions are obtained, recognizing that the image has an obstacle region; and if comparison results that the max H and the feature values do not satisfy any of the plurality of different preset obstacle recognition and determination conditions are obtained, recognizing that the image is an image to be filtered.

Specifically, based on the selected feature values mentioned above, the preset obstacle recognition and determination conditions in this embodiment may be:

If $AContours_i.diagonal>105$ or $AContours_i.height>80$, max $H>300$ and $HContours_i<0.24$, and one of the following two conditions a and b is satisfied, it is determined that there is an obstacle in the image:

a. $300<$max $H\leq400$, $AContours_i.pixels>3500$, and $BContours_i<0.01$; and b. $400<$max $H<550$, $AContours_i.pixels>4000$, and $BContours_i<0.03$.

Figure 2A:
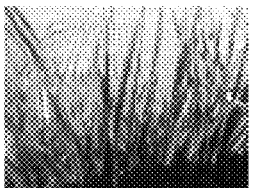
FIG. 2(*a*) to FIG. 2(*c*) show an RGB image, a segmented image, and a contour processed image in front of an automatic traveling device in a specific implementation.
Figure 2:
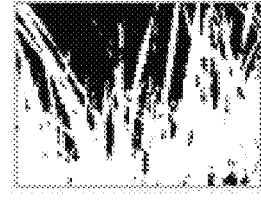
Figure 2C:
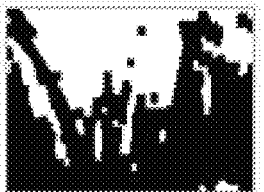

The work of a robot mower is used as an example. As shown in FIG. 2(a) to FIG. 2(c), FIG. 2(a) shows a captured RGB image in front of the automatic traveling device, FIG. 2(b) shows a segmented image obtained after image segmentation, and FIG. 2(c) shows a contour image numbered 8. max $H=467$, the feature values corresponding to the contour block numbered 8 are as follows:

$AContours_8.diagonal=92.135$, $AContours_8.height=83$, $BContours_8=0.012$, $AContours_8.pixels=7060$, and $HContours_8=0.176$.

Through determination, the above conditions satisfy $AContours_i.height>80$, max $H>300$, $HContours_i<0.24$, and condition b, indicating that there is a non-lawn region in the image.

Specifically, the preset obstacle recognition and determination conditions in this embodiment may alternatively be:

If $AContours_i.diagonal>105$ or $AContours_i.height>80$, $YContours_i>75$, max $H>300$ and $HContours_i<0.24$, and one of the following two conditions c and d is satisfied, it is determined that the distance between the obstacle in the image and the automatic traveling device is within a preset collision prevention range, and the automatic traveling device executes obstacle avoidance measures:

c. max $H\geq550$, $SContours_i<0.4$, and $BContours_i<0.11$; and d. max $H\geq550$, $SContours_i>0.4$, and $BContours_i<0.06$.

The preset obstacle recognition and determination conditions in the above implementation are only a preferred example listed in this embodiment, and may be adjusted according to actual situations in other implementations.

In a feasible implementation of this embodiment, in S7, the collecting statistics on feature values corresponding to the contour block in the edge image and the contour image includes:

S71: Obtain position information of the contour block;

S72: Compare the position information of the contour block with a preset position threshold to obtain a target contour block; and S73: Collect statistics on the feature values corresponding to the target contour block in the edge image and the contour image.

As a feasible embodiment, optionally, S7 further includes collecting statistics on a y-axis coordinate value $YContours_i$ at a bottom right corner of the contour block, and selecting a reasonable obstacle avoidance time according to a size of the $YContours_i$. $YContours_i$ represents the position relationship between the contour position of the image in front of the automatic traveling device and the automatic traveling device.

Specifically, a distance parameter between the contour position of the image and the automatic traveling device, namely, a y-axis coordinate value $YContours_i$ at the bottom right corner of the contour, may be further set in this embodiment. The position relationship between the contour position, obtained during the image contour detection, of the image in front of the automatic traveling device and the automatic traveling device may be used as an auxiliary determination element to select an obstacle avoidance time reasonably.

If an obstacle is detected in the image and an image contour block contains an obstacle image or a partial obstacle image, the position relationship between the corresponding contour block and the automatic traveling device is determined, so as to take reasonable obstacle avoidance measures.

In the case of including the feature value $YContours_i$, the preset obstacle recognition and determination conditions in this embodiment may be:

If $AContours_i.diagonal>105$ or $AContours_i.height>80$, $YContours_i>75$, max $H>300$ and $HContours_i<0.24$, and one of a and b or one of c and d is satisfied, it is determined that the distance between the obstacle in the image and the automatic traveling device is within a preset collision prevention range, and the automatic traveling device executes obstacle avoidance measures:

a. $300<$max $H\leq400$, $AContours_i.pixels>3500$, and $BContours_i<0.01$;

b. $400<$max $H<550$, $AContours_i.pixels>4000$, and $BContours_i<0.03$;

c. max $H\geq550$, $SContours_i<0.4$, and $BContours_i<0.11$; and d. max $H\geq550$, $SContours_i>0.4$, and $BContours_i<0.06$.

If the y-axis coordinate value $YContours_i$ at the bottom right corner of the contour is set in the obstacle recognition parameters, after the obstacle is recognized according to full image information, whether the automatic traveling device has executes obstacle avoidance measures further needs to be determined according to the size of the $YContours_i$.

Figure 3A:
FIG. 3(*a*) to FIG. 3(*c*) show an RGB image, a segmented image, and a contour processed image in front of an automatic traveling device in another specific implementation.
Figure 3B:
Figure 3C:
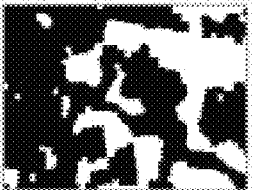

In a specific implementation scheme, as shown in FIG. 3(a) to FIG. 3(c), FIG. 3(a) shows a captured RGB image in front of the automatic traveling device, FIG. 3(b) shows a segmented image obtained after image segmentation, and FIG. 3(c) shows a contour image numbered 18. max $H=576$, the obstacle recognition parameters corresponding to the contour image numbered 18 are as follows:

$AContours_{18}.diagonal=164.07$, $YContours_i8=114$, $SContours_i8=0.28$, $HContours_{18}=0.218$, and $BContours_{18}=0$.

Through determination, the above conditions satisfy $AContours_{18}.height>80$, max $H>300$, $HContours_i<0.24$, and condition c, so there is a non-lawn region in the image. Because $YContours_{18}=114$ satisfies $YContours_{18}>75$, so it may be determined that the distance between the obstacle and the automatic traveling device is within the obstacle avoidance distance range, and obstacle avoidance measures need to be taken.

Embodiment 2

This embodiment provides an automatic traveling device, including a memory and a processor. The memory stores a computer program, and the processor implements the steps of the obstacle recognition method applied to an automatic traveling device in Embodiment 1 when executing the computer program.

Specifically, the automatic traveling device in this embodiment may be a robot cleaner, a robot mower, or the like. The automatic traveling device can effectively recognize obstacles and take reasonable obstacle avoidance measures during travel.

Embodiment 3

This embodiment provides a readable storage medium storing a computer program. When the computer program is executed by a processor, the steps of the obstacle recognition method applied to an automatic traveling device in Embodiment 1 are implemented.

Related workers may be inspired by the foregoing ideal embodiments of the present application to make diverse changes and modifications through the foregoing description without deviating from the scope of technical ideas of the present application. The technical scope of the present application is not limited to the content in the specification, and should be determined according to the scope of claims.

Those skilled in the art should understand that the embodiments of the present application may be provided as a method, a system, or a computer program product. Therefore, the present application may be in the form of a full hardware embodiment, a full software embodiment, or an embodiment combining software and hardware. In addition, the present application may be in the form of a computer program product implemented on one or more computer available storage media (including but not limited to a disk memory, a CD-ROM, an optical memory, and the like) including computer available program code.

The present application is described with reference to flowcharts and/or block diagrams of the method, device (system), and the computer program product in the embodiments of the present application. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may also be stored in a computer-readable memory that can guide a computer or another programmable data processing device to work in a particular manner, so that the instructions stored in the computer-readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operation steps are performed on the computer or programmable data processing device to generate processing implemented by a computer, and instructions executed on the computer or programmable data processing device provide steps for implementing functions specified in one or more processes in the flowcharts and/or one or more blocks in the block diagrams.

The invention claimed is:

1. An obstacle recognition method applied to an automatic traveling device, the method comprising the steps of:

obtaining an image of an environment in a traveling direction of an automatic traveling device;

separating out a chrominance channel image and a luminance channel image based on the image;

performing pre-processing and edge processing on the luminance channel image to obtain an edge image;

performing histogram statistics on the chrominance channel image to obtain a number of pixels with a maximum color proportion within a preset chrominance interval range of 15-180, denoted as max H;

performing segmentation and contour processing on the chrominance channel image to obtain a chrominance segmentation threshold and a contour image;

performing contour detection on the contour image to obtain a contour block;

collecting statistics on feature values corresponding to the contour block in the edge image and the contour image by:

obtaining position information of the contour block;

comparing the position information of the contour block with a preset position threshold to obtain a target contour block; and collecting statistics on the feature values corresponding to the target contour block in the edge image and the contour image, wherein the feature values include one of: a contour size feature value, an average roughness value, and a proportion of black pixel points contained in the contour block; or a contour size feature value, an average roughness value, a proportion of pixels within a chrominance segmentation threshold range, and a proportion of black pixel points contained in the contour block; and comparing the max H and the feature values with preset obstacle recognition and determination conditions, wherein the preset obstacle recognition and determination conditions include a plurality of different preset obstacle recognition and determination conditions, and the step of comparing the max H and the feature values with preset obstacle recognition and determination conditions to obtain recognition results comprises:

comparing the max H and the feature values with the preset obstacle recognition and determination conditions, and if the comparing results that the max H and the feature values satisfy one or more of the plurality of different preset obstacle recognition and the determination conditions are obtained, recognizing that the image has an obstacle region; and if the comparing results that the max H and the feature values do not satisfy any of the plurality of different preset obstacle recognition and the determination conditions are obtained, recognizing that the image is an image to be filtered.

2. The obstacle recognition method applied to an automatic traveling device according to claim 1, wherein the contour size feature value comprises contour area, contour diagonal length, contour width, contour height, or a number of pixels in a region to be recognized in the contour block.

3. The obstacle recognition method applied to an automatic traveling device according to claim 1, wherein the step of performing histogram statistics on the chrominance channel image to obtain a number of pixels with a maximum color proportion within a preset chrominance interval range specifically comprises:

performing histogram statistics on the chrominance channel image to obtain a chrominance component histogram;

filtering the chrominance component histogram to obtain a de-noised smooth histogram; and collecting statistics on a number of pixels with the most colors within the preset chrominance interval range from the de-noised smooth histogram.

4. The obstacle recognition method applied to an automatic traveling device according to claim 1, further comprising collecting statistics on a y-axis coordinate value at a bottom right corner of the contour block, and selecting an obstacle avoidance time according to a size of the y-axis coordinate value, wherein the y-axis coordinate value represents a position relationship between the corresponding contour block and the automatic traveling device which is an unmanned mower.

5. An automatic traveling device, comprising a memory and a processor, the memory storing a computer program, wherein the processor implements the steps of the obstacle recognition method applied to an automatic traveling device according to claim 1 when executing the computer program.

6. A non-transitory computer readable storage medium storing a computer program, wherein when the computer program is executed by a processor, the steps of the obstacle recognition method applied to an automatic traveling device according to any claim 1 are implemented.

* * * * *